United States Patent Office 3,516,916
Patented June 23, 1970

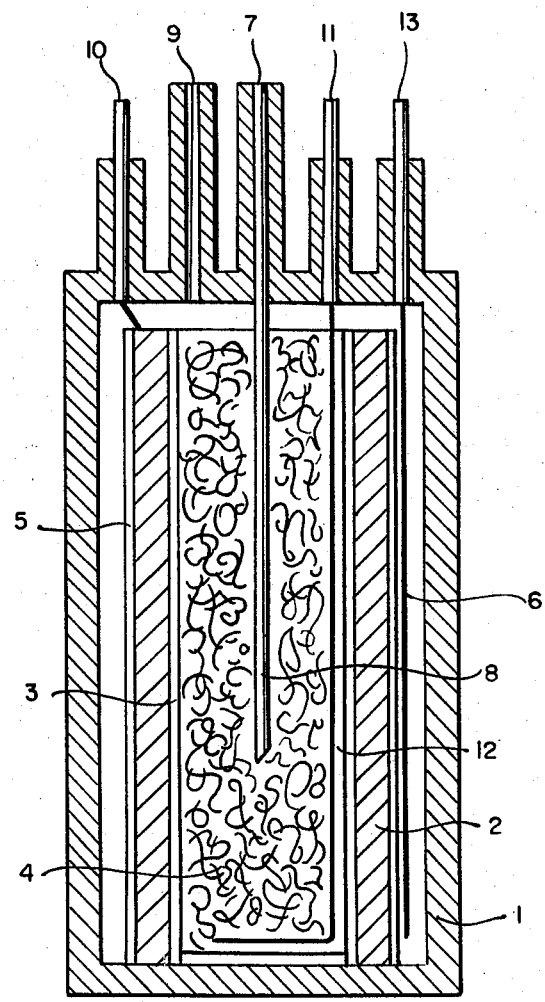

3,516,916
GALVANIC CELL OF EQUIPMENT FOR DETERMINING THE OXYGEN CONCENTRATION OF A GAS MIXTURE OR VAPOR MIXTURE
Karl Ackermann, deceased, late of Mannheim, Germany, by Karl Siebert, representative, Donaueschingen, Germany, assignor to Badische Anilin- & Soda Fabrik Aktiengesellschaft, Ludwigshafen (Rhine), Germany
Filed Aug. 24, 1966, Ser. No. 574,823
Claims priority, application Germany, Aug. 24, 1965, 1,598,070
Int. Cl. G01n 27/46, 27/54
U.S. Cl. 204—195  9 Claims

ABSTRACT OF THE DISCLOSURE

Galvanic cell for measuring oxygen concentration in an oxygen-containing gas or vapor mixture by measurement of current produced through reduction of oxygen at the cathode and embodying a hollow anode, a porous diaphragm within the hollow anode a packing of loose metal particles having a large surface area substantially filling the space enclosed by the porous diaphragm, a film of electrolyte on the metal particles, and pipe means to introduce said mixture into the packing for flow thereof through the loose metal particles.

The present invention relates to a galvanic cell of equipment for determining the oxygen concentration of a gas mixture or vapor mixture and relates in particular to a new type of cathode for such cells.

For a long time measuring equipment for determining the oxygen concentration in gases or vapors has been known which relies on the measurement of a current given by a galvanic cell. These cells consist of a cathode (the actual measuring electrode) which is in contact with the gas to be examined and at which the oxygen is reduced, a counterelectrode (the anode) which is not capable of disengaging oxygen at the cathode, and an electrolyte connecting the two electrodes.

A number of cells for this purpose have become known which differ substantially from each other in the shape and form of their electrodes. Whereas initially compact silver or gold electrodes partly immersed in the electrolyte were used as cathodes, it was later found that porous cathodes were more suitable. However, even porous cathodes have too low a sensitivity for them to be used successfully in cells of the abovementioned type, particularly when the oxygen content to be measured is small.

Cell designs for obviating this disadvantage have become known in which the electrodes consist for example of nettings which are separated from each other by porous diaphragms soaked in electrolyte and which together form a layered pack. These cells permit reduction of oxygen to the extent of practically 100% when the gas sample is supplied to it at a very low rate, which is not the case in practice, and therefore they have a current efficiency which is almost equal to the theoretical current yield, but their sensitivity at faster supply of the gas sample does not meet the requirements.

Recently cells have been described in which the cathode, electrolyte and anode similarly form a layered pack, the cathode material being porous and the amount of electrolyte in the pores of the cathode being such that the pores are partly free from electrolyte. Complete reaction of the oxygen can be achieved with such a cell, at least at low oxygen concentrations. It has the disadvantage of a relatively complicated design, however, and this offers difficulty particularly in the partial filling of the pores of the electrode with electrolyte.

The present invention has for its object to provide a galvanic cell for equipment for determining the oxygen concentration of a gas mixture or vapor mixture, based on measurement of the electric current produced at the cathode by reduction of oxygen, which (a) ensures a 100% reduction of oxygen at any concentration and (b) is distinguished by ease of operation.

The cell comprises a cathode which is in contact with the gas or vapor to be examined, an anode separated from the cathode by a diaphragm, and an electrolyte connecting the electrodes, and in accordance with this invention the cathode consists of a hollow member filled with metal wool or metal chips, through which the gas mixture or vapor mixture is passed, the walls of the hollow member being formed at least in part by the diaphragm and the electrolyte being applied as a thin film to the surface of the metal wool or metal chips.

The cathode material may be for example precious metals, particularly silver. It is also possible however to use for example copper or titanium. Particularly suitable electrolytes are strongly alkaline aqueous solutions, for example caustic soda solution or caustic potash solution. Solutions of bicarbonates, for example potassium bicarbonate, are also suitable. The electrolytes are not limited to alkaline solutions, but acid electrolytes, for example aqueous sulfuric acid, may also be used.

A suitable anode for the cell is for example a nickel-cadmium electrode such as is used in alkaline storage batteries. This electrode consists of a porous nickel grid whose pores are partly filled with cadmium, which is converted into cadmium hydroxide during the measurement. The electrode may be regenerated by applying a negative potential. In principle anodes may be used whose potential is more negative than the theoretical oxygen potential in the electrolyte concerned but is not so negative that hydrogen is separated at the anode.

The accompanying drawing illustrates diagrammatically by way of example an embodiment of galvanic cell having a cathode in accordance with this invention.

A cylindrical nickel-cadmium anode 2 is placed in a cylindrical casing 1, for example of polyvinyl chloride. A cylindrical porous diaphragm 3, for example of polyvinyl chloride, is in contact with the inner face of this electrode. The hollow space 4 formed by this diaphragm is filled loosely throughout its whole length with metal wool, for example silver wool, or chips, particularly turnings, so that no substantial resistance is offered to the passage of the stream of gas passed therethrough. Surrounding the nickel-cadmium electrode and also separated by a diaphragm 5 is an additional electrode 6 of metal foil arranged as a charging electrode. The electrical leads to the electrodes and an inlet and outlet for gas are arranged at the front end of the otherwise closed casing 1. The gas to be examined is passed into the casing through feed pipe 7 and passes through a metal tube 8 into the lower end of the cylinder. It flows through the cavities in the metal wool and leaves the cell through a gas outlet 9. The electric charge formed by the reaction of the gas is removed through the anode terminal 10 and the cathode terminal 11 which is connected with the metal wool by an electrode lead 12. The charging electrode, which is connected with the external terminal 13, is used to charge the nickel-cadmium electrode. Owing to the high charging capacity of this electrode, it is in general not necessary to effect charging more than twice a year. Obviously it is also possible to charge the electrode continuously by means of a low voltage applied thereto.

To put the equipment into operation, the cell is filled with the electrolyte. The bulk of the electrolyte is then allowed to run out again by tipping the cell. In this way the electrolyte is deposited as a film on the surface of the metal wool or metal chips. The porous diaphragms 5 and 3 also remain soaked with electrolyte.

Cells according to this invention may be used for determining any concentration of oxygen in gases. A particular advantage of the equipment is that both very low and very high concentrations of oxygen can be measured.

What is claimed is:

1. A galvanic cell adapted to measure oxygen concentration in a gas mixture or vapor mixture containing oxygen by measurement of current produced by the galvanic cell by reduction of oxygen at the cathode, said cell comprising a vessel, a hollow anode within said vessel, a porous diaphragm within said anode, a cathode comprising a packing of loose metal particles having a large surface area within said diaphragm, an electrolyte present as a film on the surface of said metal particles, and means for introducing said gas mixture or vapor mixture into said packing for flow therethrough.

2. A galvanic cell as claimed in claim 1, wherein the metal of said metal particles is silver, copper or titanium.

3. A galvanic cell as claimed in claim 2, wherein said metal particles are in the form of a metal wool.

4. A galvanic cell as claimed in claim 2, wherein said metal particles are in the form of metal chips.

5. A galvanic cell as claimed in claim 1, wherein said electrolyte is a strongly alkaline solution.

6. A galvanic cell as claimed in claim 1 further comprising a charging electrode surrounding and spaced from said anode.

7. A galvanic cell as claimed in claim 1, wherein said anode is a hollow, cylindrical nickel-cadmium electrode.

8. A galvanic cell as claimed in claim 1, wherein said porous diaphragm is in contact with the inner face of said hollow anode.

9. A galvanic cell as claimed in claim 8, wherein said porous diaphragm is made of polyvinylchloride.

References Cited

UNITED STATES PATENTS

| | | | |
|---|---|---|---|
| 913,390 | 2/1909 | Junger | 136—86 |
| 2,898,282 | 8/1959 | Flook et al. | 204—1.1 |
| 3,208,926 | 9/1965 | Eckfeldt | 204—1.1 |
| 3,223,597 | 12/1965 | Hersch | 204—195 |
| 3,315,270 | 4/1967 | Hersch | 204—1.1 |
| 3,328,206 | 6/1967 | Kroeger et al. | |
| 3,097,974 | 7/1963 | McEvoy et al. | |

TA-HSUNG TUNG, Primary Examiner

U.S. Cl. X.R.

204—280, 282, 263; 136—86